2,970,147
Patented Jan. 31, 1961

2,970,147

3-HYDROXY-N-(HETEROCYCLIC-ETHYL)-MORPHINANS

André Grüssner, Joseph Hellerbach, and Otto Schnider, Basel, Switzerland, assignors to Hoffmann-La Roche Inc., Nutley, N.J., a corporation of New Jersey No Drawing. Filed Nov. 26, 1958, Ser. No. 776,398

Claims priority, application Switzerland Dec. 4, 1957

5 Claims. (Cl. 260—285)

This invention relates to novel chemical compounds. More particularly, the invention relates to new heterocyclic substituted morphinans of the following general formula:

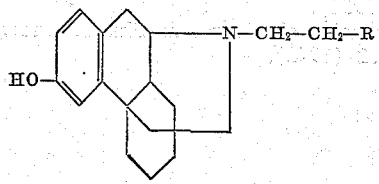

wherein R is a member selected from the group consisting of 5- and 6-membered unsaturated, heterocyclic rings, and acid addition salts thereof with therapeutically acceptable acids.

In general, the method of making the novel compounds according to the invention comprises attaching a heterocyclyl-ethyl group to the nitrogen of 3-hydroxy-morphinan. More specifically, in one method the novel compounds may be prepared by reacting 3-hydroxy-morphinan with compounds of the general formula $R-CH=CH_2$, wherein R has the above-specified significance.

As starting materials, racemic, as well as optically-active, 3-hydroxy-morphinan can be used. Suitable vinyl compounds for this reaction with 3-hydroxy-morphinan are, e.g., vinyl pyridine or vinyl pyrimidine. By this reaction, there are obtained the desired 3-hydroxy-N-(heterocyclyl-ethyl)-morphinans.

According to another method for the preparation of the novel compounds of this invention, 3-hydroxy-morphinan is reacted with acylating agents. The resulting acid amide is then reduced with an alkali metal aluminum hydride. Suitable acylating agents for this purpose are, e.g., heterocyclic substituted acetic acid halides, such as 2-furyl- and 2-thienyl-acetic acid chloride. This reaction is preferably carried out in the presence of a solvent, for example, dimethylformamide, and preferably in the presence of an acid-binding substance, such as an alkali carbonate. The resulting acid amides are difficulty soluble in water, soluble in ether and tetrahydrofuran, and easily soluble in alcohol. The acid amides are, in turn, reduced to the desired N-heterocyclyl-substituted 3-hydroxy-morphinans. This can be accomplished, for example, by means of an alkali metal aluminum hydride, such as lithium aluminum hydride, in the presence of a solvent such as ether, tetrahydrofuran, or dioxane.

The resulting N-heterocyclyl-ethyl substituted 3-hydroxy-morphinans are basic substances which are soluble in the usual organic solvents, such as alcohol, ether, or acetone. They are, however, only difficulty soluble in water. Salts of these resulting compounds may be prepared by reaction with suitable inorganic acids, such as sulfuric acid, phosphoric acid, hydrochloric acid, or hydrobromic acid, or with a suitable organic acid, such as malic acid, citric acid, or tartaric acid. The salts are soluble in water and in lower alkanols, but they are difficulty soluble in ethers.

The free bases and their acid addition salts exhibit activity on the central nervous system. They are useful as antitussives. The levo-rotatory compounds are also useful as analgesics.

*Example 1*

12.14 g. (—)-3-hydroxy-morphinan, 50 ml. methanol, 6.3 g. 4-vinyl pyridine, and 3.6 ml. glacial acetic acid were heated for 24 hours under reflux. The warm solution was then treated with 3 N-ammonium hydroxide until phenolphthalein was rendered alkaline. Upon cooling there was obtained the compound (—)-3-hydroxy-N-(4'-pyridyl-ethyl)-morphinan, having a melting point of 222–223° C. The corresponding tartrate was crystallized from ethyl alcohol. and melted at 146–147° C.; $[\alpha]_D^{20}= -38.4°$ ($c=1$ in alcohol).

Following the procedure outlined in the immediately preceding paragraph, (+)-3-hydroxy-morphinan was converted to (+)-3-hydroxy-N-(4'-pyridyl-ethyl)-morphinan characterized by a melting point of 222–223° C. The melting point of the corresponding dihydrobromide is 191–193° C., $[\alpha]_D^{20}=+51.94°$ ($c=3$ in water); and the melting point of the monohydrobromide is 215–217° C.

*Example 2*

According to the teachings of Example 1, (—)-3-hydroxy-morphinan was reacted with 2-vinyl pyridine to obtain (—)-3-hydroxy-N-(2'-pyridyl-ethyl)-morphinan, melting at 207–209° C. The corresponding sulfate melted at 175–177° C.; $[\alpha]_D^{20}$ of the sulfate $=-58°$ ($c=1.5$ in water).

*Example 3*

29 g. of (—)-3-hydroxy-morphinan were dissolved in 300 cc. of dimethylformamide at 100° C. The solution was stirred with 17.5 g. of powdered, anhydrous, potassium carbonate. There were then dropped in 24.5 g. of 2-thienyl-acetic acid chloride (boiling point 88° C./13 mm.; cf. J.A.C.S. 68 [1946], 1934) in 60 cc. dimethylformamide and the mixture stirred for 1½ hours at 120° C. bath temperature.

The hot solution was filtered and then concentrated in vacuum. The residue was dissolved in benzene and washed with water, dilute hydrochloric acid, and then again with water, in turn. After evaporating the remaining benzene, there remained 44 g. of an amide as a viscous oil.

15 g. lithium aluminum hydride was suspended in 500 cc. of absolute tetrahydrofuran. A solution of 44 g. of the above obtained amide in 100 cc. of absolute tetrahydrofuran was then dropped into the lithium aluminum hydride suspension while stirring at 40° C., and then the mixture was stirred for 4 hours at 40° C. and the mixture was then further stirred overnight at room temperature. The resulting solution was then treated with 50 cc. of water, added dropwise, while cooled by ice, and was then treated with dilute hydrochloric acid until an acid reaction to congo was shown. The tetrahydrofuran was then distilled off in vacuum, and there was obtained a hydrochloride as a crystalline product. It had a melting point of 169–171° C. Upon recrystallization from alcohol-ether, there was obtained (—)-3-hydroxy-N-(2'-thienyl-ethyl) - morphinan hydrochloride, melting at 171–173° C.; $[\alpha]_D^{20}=-65.5°$ ($c=1.0988$ in methanol). The corresponding base was prepared by reaction with ammonium hydroxide and then crystallization from butyl acetate, and melted at 244–245° C.

*Example 4*

Following the procedure of Example 3, 24.3 g. of (—)-3-hydroxy-morphinan in 250 cc. dimethylformamide was reacted with 18 g. of 2-furyl acetic acid chloride (boiling point 45–47° C./0.1 mm.; cf. J.A.C.S. 62 [1940], 1512 and 57 [1935], 1126) in 50 cc. dimethylformamide in the presence of 14.6 g. of potassium carbonate. By working up the product according to the procedure of Example 3, there was obtained the compound (—)-3-hydroxy-N-(2'-furyl-ethyl)-morphinan hydrochloride, M.P. 155–156° C. (after crystallization from alcohol-acetone); $[\alpha]_D^{20} = -64.86°(c=1.0788$ in methanol).

The corresponding base was prepared by treatment with ammonium hydroxide and crystallization from butyl acetate, and that base had a melting point of 221–222° C.

We claim:

1. Compounds of the formula

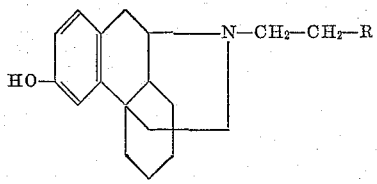

wherein R is a member selected from the group consisting of 5-membered unsaturated heterocyclic rings and 6-membered unsaturated heterocyclic rings each consisting of carbon and hydrogen and a single heterocyclic atom of the group consisting of oxygen, sulfur and nitrogen, and acid addition salts thereof with therapeutically acceptable acids.

2. 3-hydroxy-N-(4'-pyridyl-ethyl)-morphinan.
3. 3-hydroxy-N-(2'-pyridyl-ethyl)-morphinan.
4. 3-hydroxy-N-(2'-thienyl-ethyl)-morphinan.
5. 3-hydroxy-N-(2'-furyl-ethyl)-morphinan.

References Cited in the file of this patent

UNITED STATES PATENTS 2,171,159   McNally et al. _____ Aug. 29, 1939
2,885,401   Grussner et al. _____ May 5, 1959

OTHER REFERENCES

Gilman et al.: J.A.C.S., vol. 47, pp. 245–246 (1925).
Lew et al.: J.A.C.S., vol. 72, p. 5715 (1950).
World Health Organization, Technical Report Series #102, Sixth Report, pp. 8 and 9 (1956).
Hellerbach et al.: Helv. Chim. Acta, vol. 39, pp. 429–440 (1956).
Rhodehamel et al.: Jour. Am. Pharm. Assoc., vol. 31, pp. 281–282 (1942).